March 23, 1926.
C. A. OLSON
1,577,930
ECCENTRIC DRIVING MECHANISM FOR POWER WASHING MACHINES
Filed Oct. 15, 1923     2 Sheets-Sheet 2
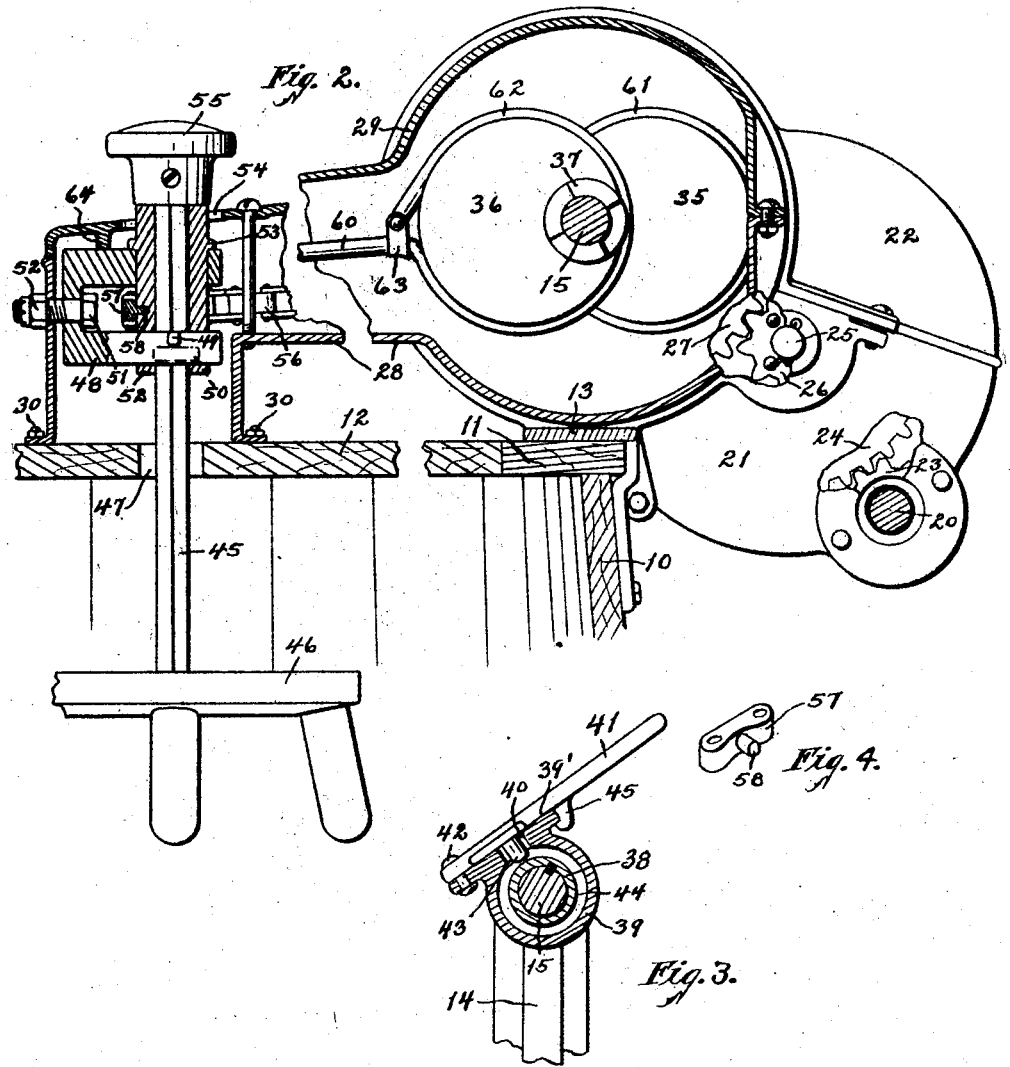
Inventor
CARL A. OLSON
by Earl M. Sinclair Atty Patented Mar. 23, 1926.

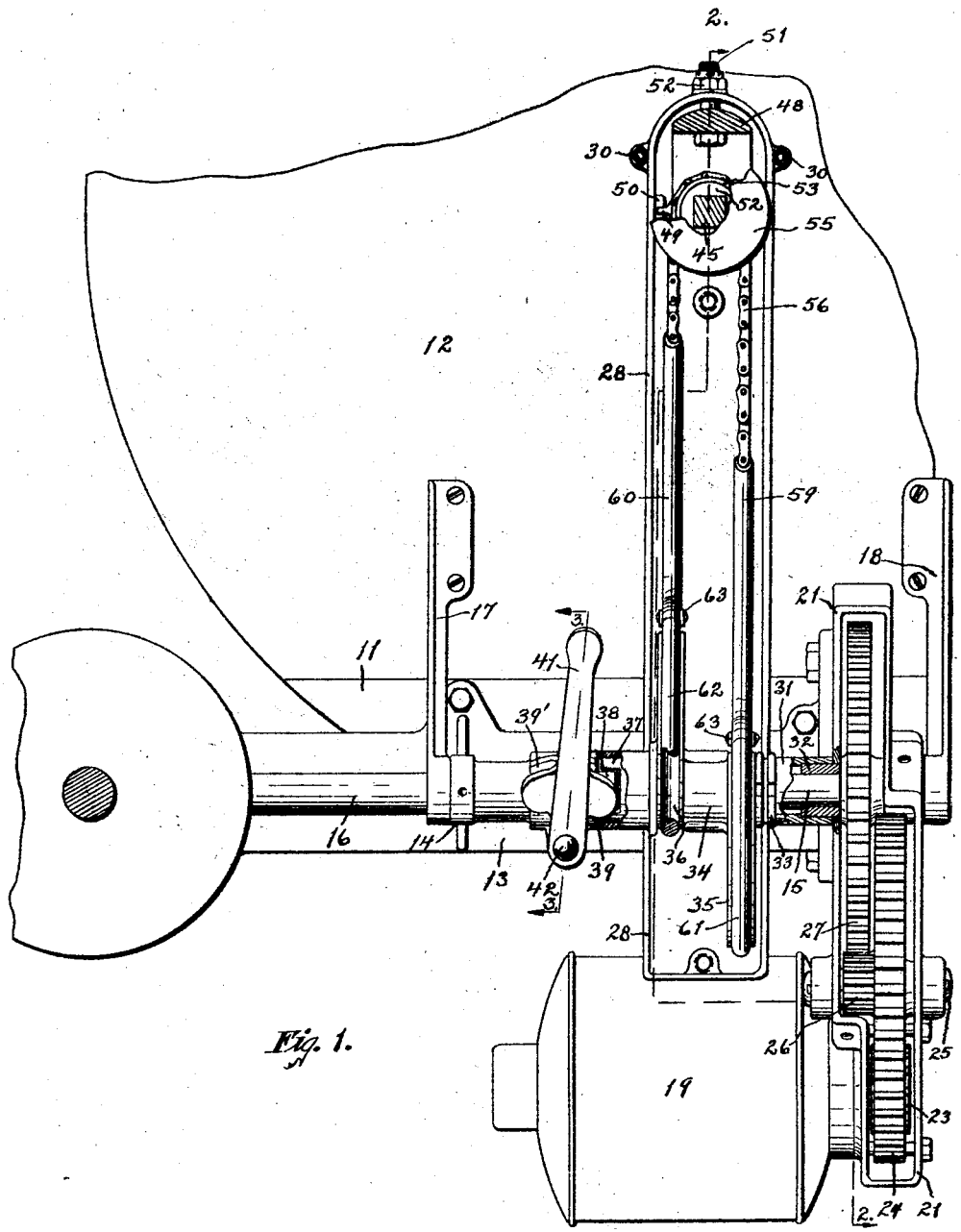

1,577,930

UNITED STATES PATENT OFFICE.

CARL A. OLSON, OF CLARINDA, IOWA, ASSIGNOR TO CLARINDA MANUFACTURING COMPANY, OF CLARINDA, IOWA, A CORPORATION OF IOWA.

ECCENTRIC DRIVING MECHANISM FOR POWER WASHING MACHINES.

Application filed October 15, 1923. Serial No. 668,695.

*To all whom it may concern:*

Be it known that I, CARL A. OLSON, a citizen of the United States of America, and resident of Clarinda, Page County, Iowa, have invented a new and useful Eccentric Driving Mechanism for Power Washing Machines, of which the following is a specification.

The main object of this invention is to provide an improved driving mechanism, including a pair of oppositely arranged eccentrics, especially designed for use on power washing machines, transforming continuous rotary into oscillatory rotary motion, at reduced speed, with the aid of efficient speed reducing gearing.

A further object of this invention is to adapt a train of spur gearing to use in a driving mechanism for washing machines.

A further object of this invention is to provide an improved flexible connector between eccentric straps and a follower device, including a special link.

A further object of this invention is to provide an improved bearing means for a follower adapted for rotary oscillation and for sliding movement, together with means for adjusting said bearing laterally relative to the driving mechanism.

A further object of this invention is to provide improved clutch connections and shifting means therefor.

My invention consists in the construction, arrangement and combination of elements hereinafter set forth, pointed out in my claims and illustrated by the accompanying drawing, in which—

Figure 1 is a plan view, partly in section, showing my improved driving mechanism mounted on a washing machine, the covers of the gear housing and eccentric housing being removed. Figure 2 is a sectional elevation of the same substantially on the line 2—2 of Figure 1, an intermediate portion being broken away to economize space. Figure 3 is a cross-section on the line 3—3 of Figure 1, showing the clutch shifting means. Figure 4 is a perspective view of a special link employed in connecting the eccentrics to the follower device.

In the construction and mounting of the mechanism as shown the numeral 10 designates a suitable support such as the tub of a washing machine, formed with a fixed cover member 11 and a movable cover member 12 adapted to overlie the major portion of the tub. A supporting plate 13 is mounted on and suitably fixed to the fixed cover member 11 and said plate is formed with an integral upstanding bearing bracket 14 between its ends. A driving shaft 15 is journaled for rotation in the bearing bracket 14 and other bearing means hereinafter described, extends longitudinally of and above the fixed cover member 11 and plate 13, and preferably is enclosed through a portion of its length by a sleeve 16. Hinge members 17, 18 are secured to the top of the movable cover member 12, extend upwardly and outwardly beyond the margin of said cover member, and have bearings at their opposite ends on the driving shaft 15. Thus a pivotal connection of the cover member 12 to the support is established, the axis of articulation being removed laterally and vertically from the joining line between the cover members 11, 12. Any suitable means may be employed to limit outward movement of the cover member 12 on its hinged supports.

A motor 19 is mounted at the side of and near the top of the tub 10 by any suitable means, preferably by the support described and claimed in my companion application executed on even date herewith, to which application reference hereby is made. The motor 19 has a shaft 20 arranged parallel with the driving shaft 15 and extending within a gear housing 21 formed on or fixed to the plate 13, extending transversely thereof and projecting considerably beyond the side of the tub; said housing being provided with a removable cover 22. Fixed to the motor shaft 20 within the housing 21 is a pinion 23 meshing with and adapted to drive a spur gear 24 mounted for rotation in said housing by means of a transverse stud 25 or shaft. Arranged for rotation with the gear 24 is a pinion 26 meshing with and adapted to drive a spur gear 27 suitably fixed to the driving shaft 15, whereby power is transmitted to said shaft at speed considerably reduced from that of the motor shaft.

An eccentric housing 28, provided with a removable cover 29, is mounted transversely of the supporting plate 13 and extends past the center of the tub 10 and movable cover member 12, to which it is attached by means of bolts 30 or the like. The outer end portion of the eccentric housing is substantially circular in form, concentric with the shaft 15, free from attachment to the plate 13 or fixed cover member 11, and is movable around said shaft when the movable cover member 12 is moved through an arc to or from open position. The eccentric housing 28 is spaced from the gear housing 21 by a bearing sleeve 31 on the shaft 15, said sleeve preferably being chambered to receive lubricant and containing a spacing sleeve 32 bearing against a face of the gear 27. At its inner end the bearing sleeve 31 is formed with a grooved flange 33 to receive marginal portions of the housing 28 and its cover 29. Loosely mounted on the shaft 15 within the housing 28 is an eccentric sleeve 34 on which are formed spaced parallel disks 35, 36, arranged eccentrically of the shaft and oppositely to one another, in such manner that the fore eccentric of one disk corresponds to the back eccentric of the other. One end portion of the sleeve 34 extends through the housing 28, at that side opposite the gear housing 21, and is formed with a clutch member 37 adapted for operative engagement at times with a clutch member 38 feathered on the shaft 15. The clutch member 38 is slidably mounted within a sleeve or housing 39 on the shaft, said sleeve or housing being formed with a flat face 39' having a slot 40 therein. A clutch lever 41 is pivoted on the flat face 39', at the point 42, and is formed with a pin 43 projecting through the slot 40 into an annular groove 44 formed in the sliding clutch member 38, whereby the clutch member 38 may be moved into and out of operative engagement with the clutch member 37 by manual oscillation of said lever. The clutch lever 41 is formed with a hooked lug 45 on its lower surface engaging a marginal portion of the flat face 39' to guide said lever in its movement and maintain engagement of the pin 43 in the groove 44, as shown in Figure 3.

A follower device is mounted at the center of the tub 10, comprising a dolly shaft 45, square in cross-section, and a dolly or agitator 46 thereon adapted to be positioned within the tub when the cover member 12 is closed, said dolly shaft extending through a slot 47 in said cover member, and within the eccentric housing 28. Mounted within the eccentric housing 28, adjacent the inner end thereof, is a bearing member 48 of bifurcated form, supported in part by lugs 49 projecting from its sides and resting on lugs 50 on the side walls of said housing. The closed end of the bearing member 48 is directed toward the inner end of the housing 28, and an adjusting bolt 51 extends through the ends of said bearing member and housing and is provided with a nut 52 on its outer end, by means of which the bearing member may be loosened relative to or drawn toward the end of the housing, thus adjusting its position relative to the driving shaft 15 and eccentrics. The arms of the bifurcated bearing 48 are vertically spaced and formed with registering bearings in which a slide bearing member 52 of tubular form is journaled for rotary oscillation, said slide bearing being formed with a vertical aperture fitted to and slidingly receiving the dolly shaft 45, whereby said shaft is arranged for oscillation with and for vertical sliding movement relative to said bearing. The slide bearing 52 is formed near its upper end with a peripheral flange 53 or shoulder resting on the top of the bifurcated bearing 48. The slide bearing 52 projects through a slot 54 in the cover 29 of the eccentric housing, and a head 55 is fixed to the upper end of the dolly shaft 45 and normally rests on the upper end of said slide bearing; but at times, as when the dolly device 46 is elevated by and rests upon a load in the tub, said head may be spaced above said slide bearing.

A chain 56, or other suitable flexible connector, engages and is fixed at its central portion to the slide bearing 52, between the arms or bifurcations of the bearing member 48. In this instance the chain 56 is shown as provided at its center with a special link 57 (particularly see Figure 4) pivotally connected to the other members of the chain and formed with a pin 58 thereon extending within a lateral hole formed in the slide bearing in that side normally away from the driving shaft 15 and eccentrics. The chain 56 is pivotally connected at its ends to eccentric rods 59, 60 located within the housing 28, and said rods are formed with integral eccentric straps 61, 62 embracing the eccentrics 35, 36 respectively. The eccentric straps 61, 62 preferably have their free ends connected to the rods 59, 60 by means of clips 63. The rods 59, 60 and straps 61, 62 preferably are circular in cross-section and the eccentrics 35, 36 are peripherally grooved to receive said straps. When the shaft 15 is operated and the member 44 is clutched to the eccentric sleeve 34, alternating rotary motion is imparted to the slide bearing 50 and to the dolly shaft and devices carried thereby by alternate draft in opposite directions on the chain 56, through the oppositely arranged eccentrics 35, 36, eccentric straps 61, 62 and eccentric rods 59, 60. The operation of the dolly devices in this manner is very quiet as there are no intermeshing gears between the driving shaft and dolly shaft, few places where friction can occur, and a small number of movable parts.

The bearing member 48 may be adjusted toward the inner end of the housing 28, to compensate for wear or accruing looseness in the eccentric devices, by taking up the nut 52 on the adjusting bolt, the slots 47 and 54 permitting limited movement of the dolly shaft and slide bearing 52, respectively, toward and away from the driving shaft.

The moving parts are all enclosed, and ample provision is made for lubricating them. The circular outer end portion of the eccentric housing 28 forms a reservoir for lubricant, into which the disks 35, 36 dip as they are rotated.

A downwardly projecting rib 64 is formed on and transversely of the inner end portion of the housing cover 29, engaging the outer end portion of the bearing member 48 and assisting in holding said member in place.

I claim as my invention—

1. A driving mechanism, comprising a support, a driving member journaled on said support and formed with oppositely arranged eccentrics, a housing enclosing said eccentrics and extending at right angles to said driving member, a bifurcated bearing mounted in said housing, a slide bearing member arranged for rotary oscillation in said bifurcated bearing, a follower device mounted for sliding movement in and oscillation with said slide bearing member, a flexible connector embracing said slide bearing member between the arms of said bifurcated bearing, said connector including a central link formed with an integral pin extending into a hole formed in said slide bearing member, and driving connections between the ends of said connector and the respective eccentrics.

2. A driving mechanism, comprising a support, a driving member journaled on said support and formed with oppositely arranged eccentrics, a housing enclosing said eccentrics and extending at right angles to said driving member, a bifurcated bearing mounted in said housing, a slide bearing arranged for rotary oscillation in said bifurcated bearing, a follower shaft arranged for sliding movement in and oscillation with said slide bearing, a flexible connector embracing and fixed to said slide bearing between the arms of said bifurcated bearing, and driving connections between the ends of said connector and the respective eccentrics.

3. A driving mechanism, comprising a support, a driving member journaled on said support and formed with oppositely arranged eccentrics, a housing enclosing said eccentrics and extending at right angles to said driving member, a bifurcated bearing adjustably mounted in said housing, an adjusting bolt engaging said bearing and extending through said housing and adapted for manipulation to adjust said bearing relative to said driving member, a slide bearing arranged for rotary oscillation in said bifurcated bearing, a follower shaft arranged for sliding movement in and oscillation with said slide bearing, a flexible connector fixed intermediate of its ends to said slide bearing, and driving connections between the ends of said connector and the respective eccentrics.

4. A driving mechanism, comprising a support, a driving member journaled on said support and formed with oppositely arranged eccentrics, a housing enclosing said eccentrics and extending at right angles to said driving member, a bifurcated bearing adjustably mounted in said housing, said housing being formed with inwardly projecting supporting lugs on which said bearing is slidably mounted, threaded means for adjusting said bearing toward and away from said driving member, a follower device mounted for rotary oscillation in said bearing, a flexible connector fixed intermediate of its ends to said follower device, and driving connections between the ends of said connector and the respective eccentrics.

Signed by me at Clarinda, Page County, Iowa, this 31st day of July, 1923.

CARL A. OLSON.